(12) United States Patent
Klein et al.

(10) Patent No.: US 7,323,102 B2
(45) Date of Patent: Jan. 29, 2008

(54) ADDITIVE DISPENSING FILTER APPARATUS

(75) Inventors: Gunnar-Marcel Klein, Spiegelberg (DE); Markus Kolczyk, Mundelsheim (DE); Guenter Jokschas, Murrhardt (DE); Michael Harenbrock, Ludwigsburg (DE); Joerg Kramer, Remseck (DE)

(73) Assignee: Mann & Hummel GmbH, Ludwigsburg (DE)

( * ) Notice: Subject to any disclaimer, the term of this patent is extended or adjusted under 35 U.S.C. 154(b) by 401 days.

(21) Appl. No.: 11/034,104

(22) Filed: Jan. 13, 2005

(65) Prior Publication Data
US 2005/0173325 A1    Aug. 11, 2005

(30) Foreign Application Priority Data
Jan. 13, 2004    (DE) ...................... 10 2004 001 983

(51) Int. Cl.
*B01D 27/00*    (2006.01)
(52) U.S. Cl. ................. 210/206; 210/767; 210/DIG. 17
(58) Field of Classification Search .............. 210/206, 210/205, 767, DIG. 17
See application file for complete search history.

(56) References Cited
U.S. PATENT DOCUMENTS

| 4,014,794 | A | * | 3/1977 | Lewis ........................ 210/199 |
| 4,066,559 | A |   | 1/1978 | Rohde |
| 4,265,748 | A |   | 5/1981 | Villani et al. |
| 5,209,842 | A |   | 5/1993 | Moor |
| 5,718,258 | A |   | 2/1998 | Lefebvre et al. |
| 7,182,863 | B2 | * | 2/2007 | Eilers et al. ................ 210/205 |

* cited by examiner

*Primary Examiner*—Duane Smith
*Assistant Examiner*—Douglas J. Theisen
(74) *Attorney, Agent, or Firm*—Crowell & Moring LLP

(57) ABSTRACT

An apparatus for filtering a liquid, with a housing, a liquid inlet arranged in the housing, a liquid outlet arranged in the housing, a filter for removing particles from a liquid stream arranged between the liquid inlet and the liquid outlet, and at least one additive for functionally altering the liquid properties arranged in the apparatus, in which the additive is arranged in the interior volume of the apparatus and is shaped in a colloidally disperse, dimensionally stable, elastic form corresponding to at least one geometric space defined by an interior structure of the apparatus or of the filter for removing the particles.

34 Claims, 7 Drawing Sheets

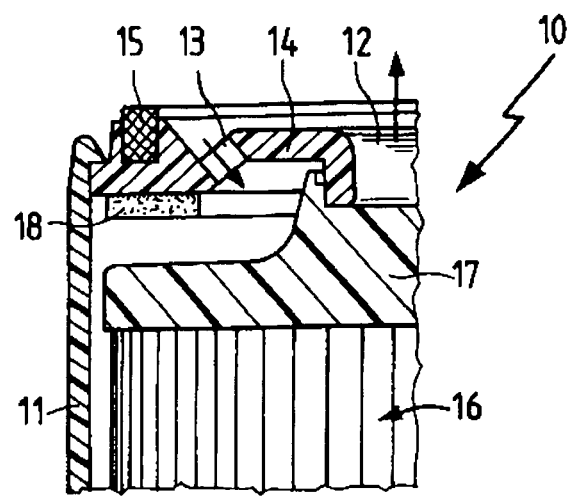
Fig.1a
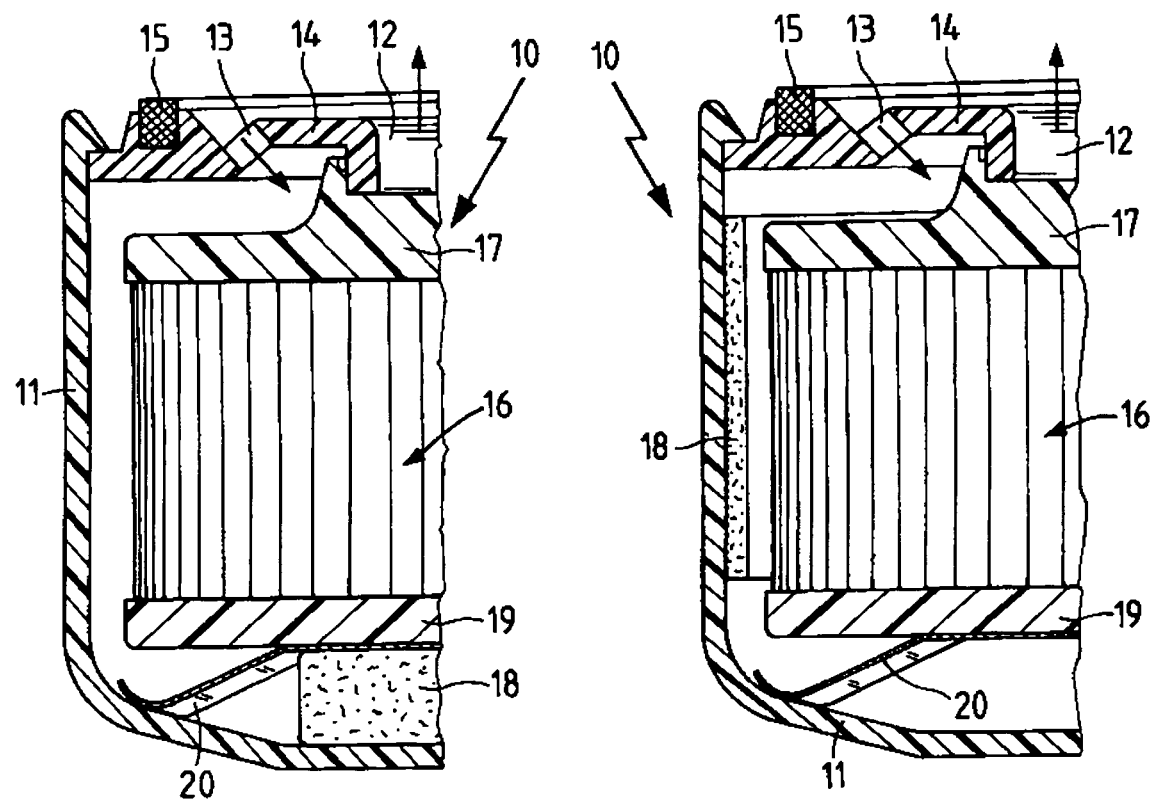
Fig.1b   Fig.1c

ADDITIVE DISPENSING FILTER APPARATUS

BACKGROUND OF THE INVENTION

This invention relates to an additive dispensing filter apparatus and to a method for dispensing an additive to a liquid.

It is known that operating liquids can be conditioned through filters so that the liquid system is protected from wear and damage. This is accomplished by removing particles, in particular particles that are relevant for wear, from the liquid system by filtration. It is also known that special chemical substances may be added to a filter for continuous oil care. In contact with the liquid to be filtered, the chemical substances (additives) are dissolved and in doing so release their active ingredients. These active ingredients fulfill the following functions: they protect the oil from thickening, from an increase in viscosity due to oxidation; they improve the lubricant properties of moving parts, dissolving deposits, dispersing foreign substances, providing protection against wear and improved flow properties. These additives may be accommodated anywhere in the filter system. In principle, the known approaches include those in which the additive is released only when a sheathing or covering part has dissolved away or the additives used have foreign substances such as polytetrafluoroethylene (e.g., PTFE or Teflon™) added to them.

U.S. Pat. No. 4,265,748 describes a liquid filter for an internal combustion engine, where an additive is arranged in a container within the filter, the container being closed by a diaphragm which dissolves on coming in contact with hot oil.

U.S. Pat. No. 4,066,559 describes additives embedded in polymers which dissolve at predetermined engine temperatures.

U.S. Pat. No. 4,014,794 proposes an oil filter which uses oil-soluble solid polymers which decompose slowly in oil and thereby act as viscosity modifiers. In addition, other additives may also be embedded in the polymer.

U.S. Pat. No. 5,209,842 describes an oil filter cartridge for an internal combustion engine, in which an additive in the form of solid PTFE particles is arranged inside the cartridge, where the particles break up on coming in contact with the hot oil and are transferred to the oil circulation through the filter element.

One disadvantage of these approaches is that the additive is not released until a sheathing or covering part has been dissolved or inert vehicle substances such as polymers are used or foreign substances such as PTFE are added. One problem here is that substances whose effects on the oil circulation are not absolutely known are being added to the oil circulation. Other approaches consist of using complex mechanical systems such as special types of encapsulation, perforated jacketing, special injectors and/or separate rooms that are to be acquired in addition are used. Examples of this are cited in U.S. Pat. No. 5,718,258. One disadvantage here is the high and very cost-intensive design complexity to achieve effective addition of an additive to the liquid circulation.

SUMMARY OF THE INVENTION

It is therefore an object of the invention to provide an improved additive-dispensing liquid filter.

Another object is to provide an additive-dispensing liquid filter which avoids the disadvantages described above.

A further object of the invention is to provide an additive-dispensing liquid filter which is inexpensive to manufacture and easy to handle.

It is also an object of the invention to provide an additive dispensing liquid filter which can be used to introduce additives into a liquid in a controlled manner.

These and other objects are achieved in accordance with the present invention by providing an apparatus for filtering a liquid, comprising a housing, a liquid inlet arranged in the housing, a liquid outlet arranged in the housing, a separating element arranged between the liquid inlet and the liquid outlet for removing particles from a flow of the liquid, and at least one additive body arranged in the apparatus for modifying a functional property of the liquid, wherein the additive body has a dimensionally stable, elastic form corresponding to and arranged in at least one geometric space defined by interior structure of the apparatus or by the filter or both.

An additional object is to provide an improved method of introducing an additive into a liquid.

Yet another object of the invention is to provide a method of introducing an additive into a liquid in a controlled manner.

In accordance with a further aspect of the invention, the objects are achieved by providing a method of adding an additive to a liquid comprising providing an apparatus for filtering a liquid comprising a housing, a liquid inlet arranged in the housing, a liquid outlet arranged in the housing, a separating element arranged between the liquid inlet and the liquid outlet for removing particles from a flow of the liquid, and at least one additive body arranged in the apparatus for modifying a functional property of the liquid, and passing the liquid through the apparatus, whereby the additive body decomposes at a controllable rate upon contact with the liquid.

The apparatus according to the invention for filtering a liquid comprises a housing, a liquid inlet arranged in the housing and a liquid outlet arranged in the housing, a separating element being provided between the liquid inlet and the liquid outlet for removing particles from the liquid flow and in addition at least one additive body being provided in the device for functionally changing the liquid properties. This device may be arranged in the main flow or in the secondary stream of a liquid circulation, and the housing may be of any desired shape. The liquid inlet and liquid outlet may be situated on opposite sides of the housing or may be arranged concentrically with one another. This arrangement is irrelevant for the function of the present invention. All that is important is that at least one separating element for removing particles from the liquid flow is to be arranged between the inlet and outlet with a seal. The additive is situated or shaped inside the housing, i.e., in the interior volume of the device corresponding to at least one geometric shape defined through the interior structure of the device or the means for removing the particles. The additive here is in a colloidally disperse form. The additive thus has a gelatinous, elastic but nevertheless dimensionally stable aggregate state so that it can be manufactured in a geometric shape and thus can be adapted to the geometric specifications through the interior structure of the device or the agent for removing the particles. Therefore, an approximately form-fitting connection can be achieved between the housing and/or the means for removal of particles. The additive gel in principle does not require further sheathing by soluble components. The additive components are released preferably over the standing time of the filter device so that the total demand for additive is lower than if the additive were added all at once at the beginning. This makes it possible to achieve either the same function values with a lower total quantity of additive, as is required currently in combination with the low SAP oils, or far better function values can be achieved with the same total quantity of additive. It is advantageous that this concept can be used for all filterable liquids containing additives, e.g., motor oil and transmission oil, fuels, compressor oil and hydraulic oil, urea-water solutions, coolants and lubricants, etc. It is also advantageous that the geometric givens of the interior volume of the housing due to the moldability of the additive can be utilized to arrange the additive in the housing of the filter device without having to meet other technical prerequisites pertaining to the accommodation, securing and liquid flow around the additive. It is thus possible through a skilled choice of the geometry of the additive to integrate it into standard filter devices without having to make any changes in the device. On coming in contact with the liquid to which the additives are to be added, the additive gel gradually dissolves into its different additive components. Thus the desired additives can be used as is without having to use a carrier polymer or a complex technical arrangement. The connection within the additive gel is based on a physical crosslinking due to polar interactions between partially charged functional groups. However, a polymer compound is based on a chemical compound of many individual monomers of a monomer to form a single long chain polymer. Gels are mixtures of two or more substances and have a semisolid form which tends to be more like a solid object than a liquid (Parker, *Dictionary of Scientific and Technical Terms*, Fifth Edition, McGraw Hill, copyright 1994). Any gel obtained from a combination of at least two liquid-soluble additives may be included under the heading of additive gel. This is intended to include all combinations of different dispersants, dispersants and an acid, a dispersant and a base as well as other combinations. Other properties of gels in colloidally disperse form can also be found in *Römpps Chemie-Lexikon* [Römpp's Chemistry Lexicon] by Otto Albrecht Neumüller in the 8th edition of 1983 from Franckh'sche Verlagshandlung [Publishing House].

According to an advantageous embodiment of this invention, the agent for removing the particles from the liquid flow is at least an essentially hollow cylindrical filter element. The filter element for filtering may have filter paper folded in any way or, e.g., a coiled nonwoven for filtering, and any materials known in the state of the art for particle filtering with liquids may be used here.

According to another embodiment of this invention, the hollow cylindrical filter element has in the interior a support tube which is arranged concentrically and ensures a stabilization of the filter medium. The support tube may be manufactured of synthetic resin material (i.e., plastics) or other materials suitable for use with liquids and may be detachably or undetachably joined to the filter medium. These embodiments may be used with replaceable filters as well as with filter modules or filter cartridges.

According to another variant of this invention, the housing is undetachably connected to the housing cover and thus to the filter element and has means for detachable connection to a connecting flange situated in the liquid circuit. This design characterizes the traditional replaceable filter, where the filter device is removed from the liquid circuit after a predetermined period of use and replaced by a new device. For example, a central screw connection may be provided as the means for detachable connection to a connecting flange situated in the liquid circuit, the screw connection being used to provide a peripheral seal, but other detachable types of connection are also conceivable as long as they ensure sealing as long as sealing of the liquid circuit with respect to the environment is ensured.

According to an alternative embodiment, the housing can be opened in a nondestructive manner and the filter element in it can be exchanged, whereby the housing has means for detachable connection to a connecting flange situated in the liquid circuit and other function elements are optionally arranged in the housing. This embodiment describes the traditional filter module design, whereby there is the possibility here that other function elements, e.g., a liquid cooler or sensors, may be integrated into the housing. By detaching a housing part from the connecting flange, the filter element is exposed, and the filter element can then be removed from the remaining housing part and replaced. Likewise the additive which in the normal case should be completely dissolved at the point in time when the filter medium is replaced can also be replaced. The housing can be detachably connected to the connecting flange by any means, whereby the housing preferably has a hollow cylindrical bell shape with a thread and a gasket which is arranged in the housing and acts radially and/or axially is provided for sealing the liquid circuit from the environment.

According to another alternative embodiment of this invention, the means for removing the particles from the liquid stream includes a rotor situated in the housing, whereby the housing is the stator corresponding to the rotor. This arrangement describes the traditional case of a centrifuge for separating particles from a liquid stream, for example, whereby the liquid in the interior of the housing is set in rotation by the rotor and the particles are separated from the liquid by centrifugal force acting on them. Again in this case it is sometimes necessary to achieve a functional change in the liquid properties or to maintain the same liquid properties over a certain period of time through the use of additives.

In one advantageous variant of this invention, the additive in gel form is arranged between two filter elements in the filter housing, whereby the filter elements are detachably or undetachably joined together. Preferably the two filter elements are hollow cylinders and the additive provided between the filter elements also has a hollow cylindrical shape. The two filter elements can be detachably clipped together here by a type of adapter or they may be joined together undetachably by butt welding or gluing, for example, whereby the additive gel ring is arranged in the adapter plate. The additive gel ring is guided into its proper position before assembling the two filter elements together, so this prevents the liquid from flowing through due to the location of arrangement of the additive gel ring, which would avoid bypassing filtration. A filter element designed in this way may be used, for example, in exchange for one piece standard hollow cylindrical filter elements. Due to this special type of arrangement of the additive, it is not necessary to redesign the housing.

According to an alternative embodiment of this invention, the additive is arranged at one or both ends of the filter element. In this variant, the gel additive is preferably in the form of a disk but it may also be designed in the form of a ring, plate or some other shape. Due to the dimensional stability of the gel additive, it is possible to join it detachably or undetachably by a non-positive or positive connection, e.g., to an end disk of the filter element or to arrange the gel additive between the end disk and the filter element.

In a refinement of this invention, the additive is at least partially hollow cylindrical in shape and is connected by a corresponding receptacle to the filter element. In this form, the geometric shape of the receptacle and the additive correspond to one another in such a way as to form a tight connection by joining the additive and receptacle.

According to one embodiment of this invention, the additive is joined to filter element in segments extending axially. The segment may constitute a type of axial piece of cake and/or a segment of a hollow cylindrical partial piece extending axially.

In an alternative arrangement, the hollow cylindrical filter element is pleated with stellate pleating and the gel additive is arranged in at least one individual fold. Again in this variant, no additional space is needed to accommodate the additive and existing systems can be converted immediately to a system which dispenses additive with such a modified filter element. Individual pleats provided with the gel additive again assume their intended filtering effect after the additive has dissolved so that there is no restriction on the filter effect over the entire duration of filtering. The additive is preferably distributed in multiple individual folds over the circumference of the filter element. After changing the liquid and filter, the filter folds which are blocked by the additive gel do not contribute to the filtration effect (the liquid already having been cleaned from the beginning); with progressive soiling, the filter folds become clear again due to the dissolving of the additive, so that a uniform filter quality is still ensured.

According to another variant of this invention, the additive extends in the form of a hollow cylinder over at least a partial area of the hollow cylindrical filter element which has a lower effective diameter over this partial area than the remaining part of the filter element. In the partial area in which the additive extends over the hollow cylindrical filter element, the filter element has a lower fold depth than in the remaining area. Therefore the additive in hollow cylindrical form can be arranged in the interior or in the outside area of the filter element, depending on the reduction in the pleat depth. According to this procedure, the projected area of the filter element including the additive gel ring preferably has the same area as a filter element without a reduction in fold depth. When the additive gel ring is arranged in the interior area of the filter element, the free inside diameter of the filter element preferably remains the same over the entire area.

In a modification of this invention, the additive is arranged in or on the support tube by means of a corresponding geometric design, whereby the support tube is preferably made of synthetic resin material. Therefore in the design of the support tube, receptacle points are provided for attaching the gelatinous additive in or on the support tube in accordance with these receptacle points. The additive may also be in the form of a hollow cylinder which is inserted into the support tube and/or it may be attached in the form of a pin in the inside radius of the support tube. There are hardly any limits to design freedom here. It is important only to ensure that an excessively great pressure difference does not develop between the clean side and the unfiltered side due to the arrangement of the additive for the period of time in which the additive is not yet completely dissolved.

According to another embodiment of this invention, in at least one segment the additive is arranged in the interior area of the support tube, whereby the support tube is designed with double walls at least in this area. The additive is accommodated here in the double-wall part of the support tube and is held by it. The two walls are perforated so there is liquid contact with the additive and the additive can release its active ingredients to the liquid. In the double-wall design, the support tube may be designed in one piece with the second wall or it is also possible for the second wall to be detachably or undetachably jointed subsequently to the support tube.

According to another embodiment of this invention, the means for detachable connection between the housing and the connecting flange is provided in the housing cover, and the additive is arranged on and attached to the side of the housing cover facing inward. The housing cover here has flow-through openings for the liquid inlet and the liquid outlet and is preferably connected to the sealing flange with a seal with a seal by a screw connection. The housing cover here is preferably in the form of a cylindrical disk having an inside thread on the inside concentrically, the thread being screwed onto a connection on the connecting flange which is provided with outside thread. On the side of the housing cover facing inward, the additive in the form of a gel is held on the housing cover by suitable fastening devices. The fastening devices may be, for example, barbed points which can be pushed into the elastic additive gel. Likewise, holding clamps, half-open volumes or gluing are also feasible.

In one advantageous embodiment of the invention, the housing is constructed essentially in the form of a pot and the additive is situated in the cylindrical part of the pot-shaped housing on the inside housing wall. The additive gel here is preferably embodied as a hollow cylindrical shape and is in contact with the inside walls of the cylindrical part of the pot-shaped housing. It is clipped in place here by means of suitable receptacles, for example, or held by a non-positive and/or positive connection. It is also conceivable for a wide groove running radially around the circumference to be provided inside the cylindrical part of the pot-shaped housing with the hollow cylindrical additive gel being placed in this groove. However, it is also conceivable for segments of the additive get to be arranged in the housing, distributed over the circumference of the cylindrical interior volume of the pot-shaped housing.

According to an alternative arrangement, the additive is arranged at the bottom of the pot-shaped housing. The additive may be anchored here in the bottom area of the pot-shaped housing, e.g., in a manner comparable to that of an insert part. Of course sufficient room must be provided in the bottom area to arrange the additive there without limiting the extent of the filter element. The additive here is designed to correspond to the inside contour of the bottom area and may thus be placed easily in the bottom and attached to the bottom.

According to an alternative embodiment of this invention, the additive is detachably connected to the bottom of the pot-shaped housing. This has advantages especially in the area of filter modules, because when the filter element is changed, the additive can also be replaced. In general, the pot-shaped housing is dissolved to expose the filter element inside it for replacement and in this step a new additive gel can also be pressed into the bottom of the pot-shaped housing. Through suitable use of claws, the additive is connected to the bottom and then cannot fall out during further handling. This measure ensures that a permanent supply of additive is ensured over many cycles of filter changes.

As an alternative to this, it is advantageous to arrange the additive as a sleeve in the cylindrical part of the pot-shaped housing, in which case the additive is replaceably attached to the housing. This solution is also aimed at filter modules, where redosing of the additive when the filter element is replaced must be ensured. The additive here is shaped in the form of a sleeve or hollow cylinder and is attached, e.g., by claws or clamping, in the cylindrical part of the pot-shaped housing. It is also possible to arrange the additive gel as ring in at least one groove provided in the cylindrical part of the pot-shaped housing.

In one advantageous embodiment of the invention, inside the housing there is another housing which is equipped with openings and which holds the additive. This additional housing may be in the form of a basket or, for example, an indented, perforated partition. Furthermore, this additional housing either has an opening for replacing the additive gel or has a possibility for opening so that a new additive in gel form may be added when changing the filter element.

According to another embodiment of this invention, the filter device is constructed as a centrifuge and the additive is replaceably arranged in the rotor. It is important here for the additive to be arranged in the rotor in a rotationally symmetrical configuration to prevent an imbalance during rotation. The additive may be arranged in the interior or in the exterior of the rotor and, as described above, it may be replaceably connected to the rotor, e.g., by a peripheral groove or by the use of claws.

As an alternative, the additive may be replaceably arranged in the stator of the centrifuge, i.e., in the housing of the centrifuge, any arrangement being possible, the only requirements for the arrangement being the space relationships. It is conceivable here for the additive to be arranged on the housing walls or on the housing bottom, for example, again preferably through the use of claws, clips or by arranging it in an additional basket.

For a method of adding additives to a liquid, a filter device as described above is used. The device has a housing, a liquid inlet situated in the housing and a liquid outlet situated in the housing, means for removing particles from the liquid stream being provided between the liquid inlet and the liquid outlet. An additive for functionally changing the liquid properties is situated in the housing, the additive being arranged and shaped in a colloidally disperse, dimensionally stable and elastic form, arranged in the interior volume of the device corresponding to at least one geometric specification based on the interior design of the device or as a means for removing the particles. The liquid which has been provided with the additive and is to be filtered is passed here through the device, where the additive comes in contact with the liquid and decomposes or dissolves in contact with the liquid. The rate of decomposition or dissolution can be controlled, whereby controllably dosable is to be understood to mean adjustable or regulable. The actual decomposition or dissolving rate per unit of area of the additive which is in contact with the liquid is adjustable through the chemical makeup of the additive. With the help of the known rate of decomposition, the desired rate of decomposition can be set through the arrangement and shaping of the additive gel in the interior of the device and through design measures in the interior of the housing. This gives the possibility of adjusting the rate of decomposition of the additive to the conditions according to the use conditions of the filter device.

According to an advantageous embodiment of this method, the rate of decomposition is controlled by partial encapsulation of the additive. In this way the area of the additive coming in contact with the liquid can be influenced in such a way as to control the release of additive preferably over the entire duration of the filtration interval.

Alternatively, the method may be influenced in such a way that the decomposition rate is controlled by the positioning of the additive in areas having a suitable flow rate. The decomposition rate is easily influenced by increasing or reducing the flow rates. Thus on the basis of the flow rates in the interior of the housing, known from experiments, it is possible through the positioning of the additive to adjust the decomposition rate to the filtration interval until changing of the filter element.

Another possibility for controlling the decomposition rate is to perform a warming by means of a heating and/or cooling element in the area of the additive configuration, depending on the desired rate of release of the additive. For example, a sensor here may measure the liquid quality and influence the warming of the heating or cooling element via control signals such that a permanently uniform liquid quality is adjustable. For this case, an increase in temperature in the area of the additive configuration causes an increased release of additive, and a reduction in temperature causes a reduced rate of release additive.

It is likewise possible to control the rate of decomposition by varying the effective liquid wetting area of the additive over the duration of the changing interval. This may be accomplished, for example, by way of a dissolving membrane placed over the additive or by a special arrangement of the additive in the housing. For example, if the additive is introduced into a conically shaped housing section of the housing, then the effective liquid wetting area of the additive is also reduced over the course of decomposition due to the reduced diameter of the cone.

According to an alternative embodiment of the method, the additive is arranged in the housing in encapsulated form, with openings being provided in the encapsulation, the openings being variable such that all opening diameters between zero and full opening are achievable. This may be accomplished, e.g., by direct motor drive or via a kinematic coupling of these openings. In addition, a sensor is provided in the liquid circuit to measure the liquid quality and at least one of these measured results leads to an adjustment in the opening size of the openings of the additive container. In this way it is possible to actively and directly regulate the additive release rate as a function of the prevailing liquid quality.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which:

FIG. 1 shows various embodiments of an inventive replaceable filter in a sectional view;

DESCRIPTION OF PREFERRED EMBODIMENTS

Figure 2:
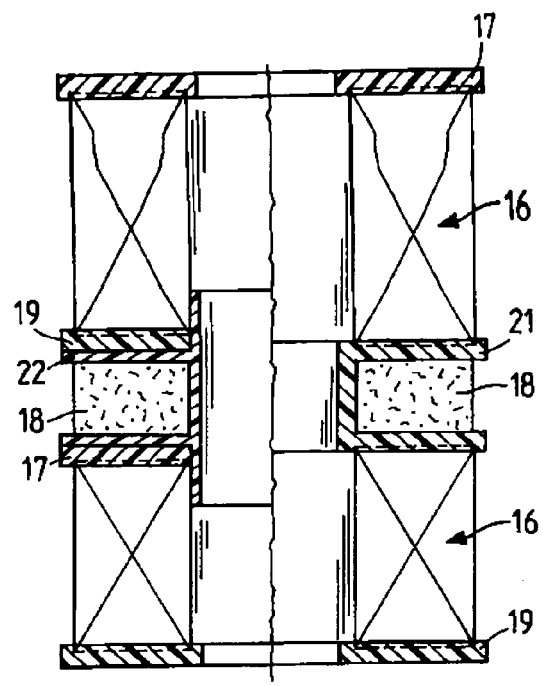
FIG. 2 shows a special embodiment of an inventive filter element in a sectional view.

FIGS. 1a, b and c show an inventive replaceable filter in a sectional view. FIG 1a shows a part of the filter device 10 with a housing 11, whereby an outlet 12 and an inlet 13 are arranged in a housing cover 14 which is undetachably joined to the housing 11. The housing cover 14 has a peripheral quadrilateral gasket 15 which ensures an axial sealing of the filter device 10 in cooperation with a connecting flange (not shown here). The inlet 13 and the outlet 12 are separated by a filter medium 16 with an end disk 17 mounted at the top end. The filter medium 16 is a hollow cylindrical paper filter element with stellate pleating. The end disk 17 ensures the separation of the crude side from the clean side in the upper area, providing a seal radially and axially. In the lower area of the housing 14, an additive 18 is arranged circumferentially in the form of a ring; because of its gelatinous substance, it has both dimensional stability and elasticity and is glued to the housing cover 14. The additive 18 here is arranged on the crude side of the filter device 10 with the oncoming liquid flowing around it, causing it to decompose, i.e., dissolve and release its active ingredients to the liquid.

FIG. 1*b* shows an alternative embodiment of the filter device 10 in a partial sectional view. The filter element here consists of an upper end disk 17, a filter medium 16 which in turn consists of filter paper in stellate pleating and an upper end disk 19. The end disks 17 and 19 are preferably made of a thermoplastic material and are joined to the filter medium 16 by gluing, partial fusion or butt welding, for example. The upper end disk 17 is preferably produced by the two-component process whereby the upper area which provides the radial and axial seal is made of a soft synthetic resin material. The lower end disk 19 is pressed axially upward by a spring 20 which is supported on the bottom of the housing 11 and thus secures (the lower disk secures) the upper end disk 17 with respect to the outlet 12 by the axial stop. The additive 18 is in this case arranged as a block in the space between the lower end disk 19 and the bottom of the housing 11. The end disks 17, 19 may of course also be made of metal.

FIG. 1*c* shows a third variant of an inventive replaceable filter 10. The basic design is the same as that in the two preceding figures, except that here the additive 18 is designed as a hollow cylinder and is arranged in the interior of the cylindrical portion of the pot-shaped housing 11. The additive here may also consist of individual segments, depending on the quantity desired, or it may be designed to be discontinuous. The additive here may be attached to the housing 11 by gluing, for example, or it may be pressed into the housing, for example, so that the connection is then a non-positive connection.

FIG. 2 shows a partial section through an inventive filter element. Parts corresponding to those in the previous figures are labeled with the same reference notation. Two filter elements here are connected by a connecting piece 21, 22. On the left side, both filter elements have an upper end disk 17 and a lower end disk 19. The lower end disk 19 of the upper filter element and the upper end disk 17 of the lower filter element are joined to a connecting piece 22 by an adhesive or welding method, for example. The hollow cylindrical connecting piece has a larger circumferential groove which holds the additive 18. On the right side, the lower part of the filter medium 16 of the upper filter element is accommodated directly by a connecting piece 21 and the upper part of the filter medium 16 of the lower filter element is also accommodated in the connecting piece 21. The connection here is established by adhesive or welding methods, for example, as is the case with the standard end disk, and the connecting piece 21 is designed as a U-shaped hollow cylinder, with the two legs of the U pointing upward. The additive 18 is arranged between these legs.

Figure 3:
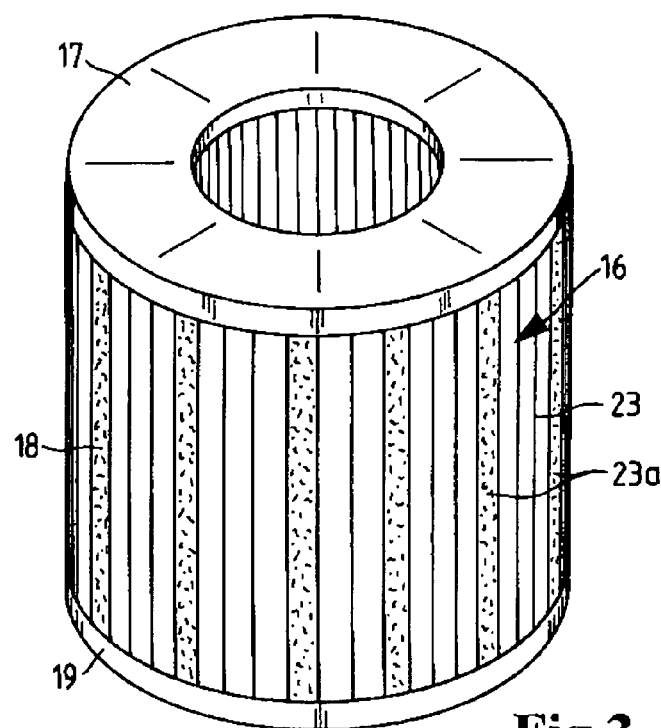
FIG. 3 shows a perspective view of another embodiment of the inventive filter element.

FIG. 3 shows a perspective view of another embodiment of the inventive filter element. Parts corresponding to those in the previous figures are identified by like reference numerals. The filter element again consists of a filter medium 16 having zigzag pleats, where the end faces are embedded in an upper end disk 17 and a lower end disk 19. The additive 18 is dosed into the folds between the individual pleats 23 of the filter medium 16 at regular or irregular intervals. The ratio between the open pleats 23 and the additive-filled pleats 23*a* is to be selected so that the desired filtration effect can be achieved even at the beginning and the pressure drop does not become too great.

Figure 4A:
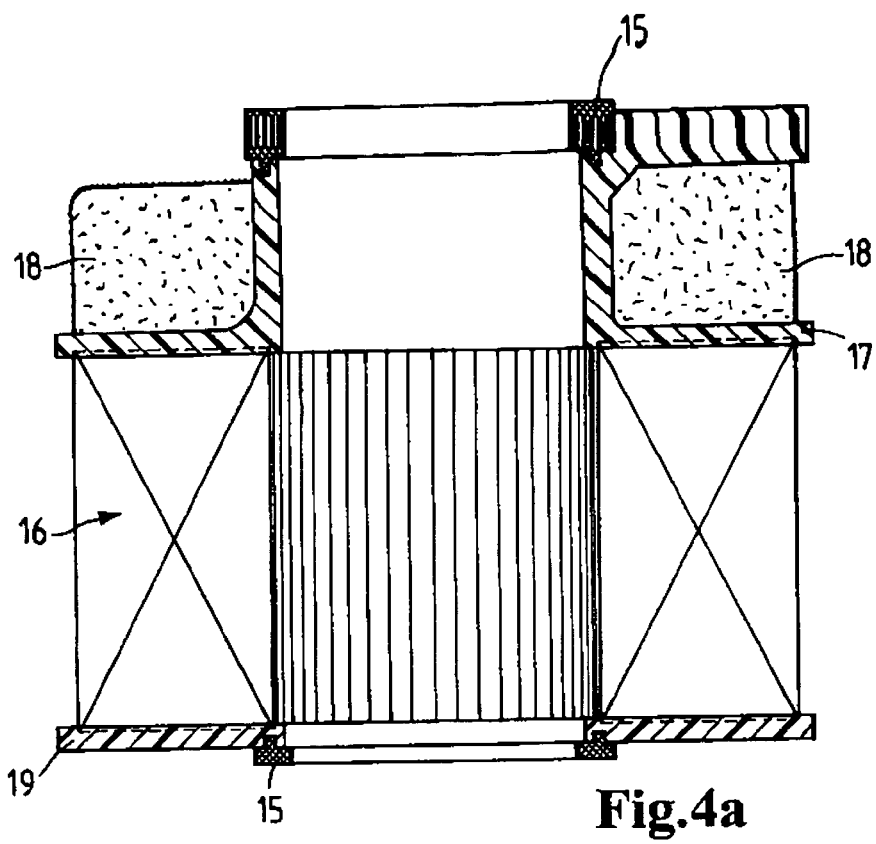
FIG. 4 through FIG. 9 show additional embodiments of inventive filter elements in a sectional view.
Figure 4B:
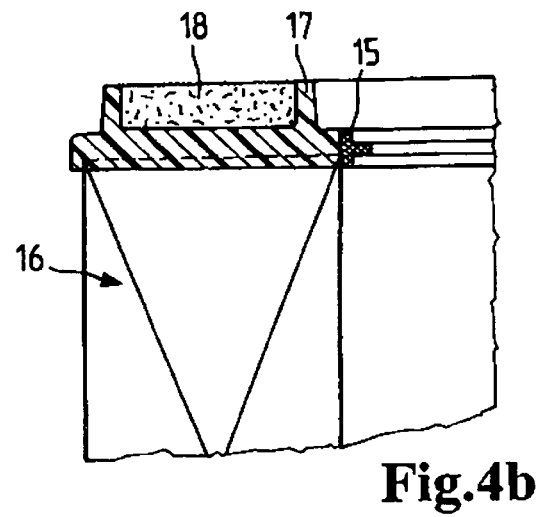

FIG. 4*a* and FIG. 4*b* show another embodiment of the inventive filter element in a sectional view. Two variations of the additive arrangement in the upper end disk 17 are shown in a partial sectional view in FIG. 4*a*. Parts corresponding to those in the preceding figures are identified by like reference numerals. The upper end disk 17 on the left side of the partial section here is in the form of an L turned on its side, with the lower leg connected to the filter medium 16 and the additive 18 arranged between the two legs. A gasket 15 which provides a sealing effect both radially and axially is provided at the end of the upper leg. The additive may of course also be arranged beneath the filter medium 16 via an identically shaped end disk. The upper end disk 17 on the right side of the partial section has a U-shaped design, with the two legs of the U directed outward. Here again, the upper end disk 17 has a gasket 15 for radial and axial sealing of the system in the axially closing upper area. The additive here is arranged between the two legs of the upper end disk 17. In both cases, the end disk 17 is joined to the filter medium 16 in the manner already described above.

FIG. 4*b* shows a third variant of the arrangement of the additive 18 in the end. The end disk 17 here is also in the form of a U but the two legs are directed axially. The additive 18 is again arranged in this groove-shaped intermediate space between the two legs of the upper end disk 17. The gasket 15 here is designed as a plain radial seal. The connection between the end disk 17 and the filter medium 16 is established as described above.

Figure 5A:
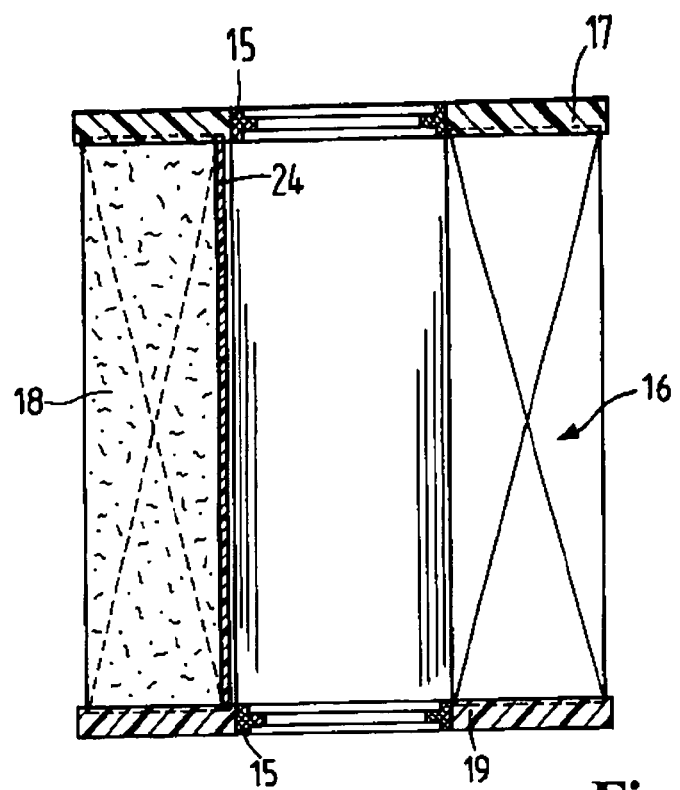
Figure 5B:
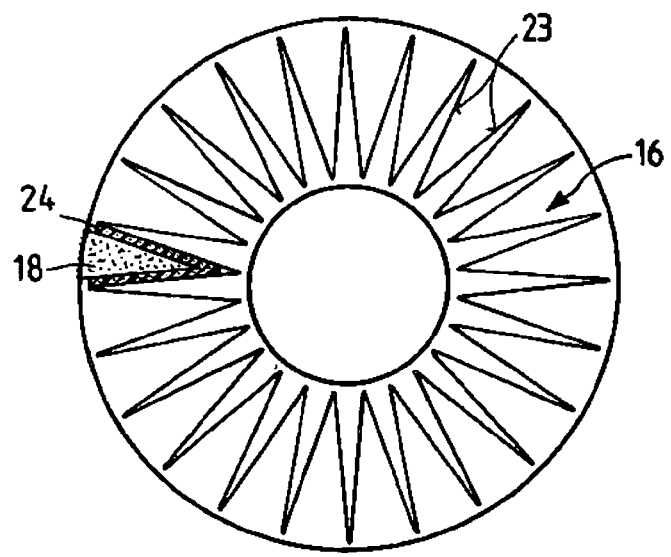

FIG. 5*a* and FIG. 5*b* show another embodiment of the inventive filter element in a sectional view. Components corresponding to those in the previous figures are identified by like reference numerals. The additive here is arranged in a V-shaped segment 24 which is continuous axially and is arranged between two adjacent folds 23 in the filter medium 16. This receptacle segment 24 is preferably made of a thermoplastic material and is attached in the end areas, preferably to the end disks 17 and 19; likewise for the filter element 16. However, depending on the desired effect, it is also possible to integrate multiple receptacle segments 24 into the filter element. Due to this receptacle segment 24, the additive gel 18 receives additional stabilization.

FIG. 5*a* shows a gasket. 15 like that in FIG. 4*b*.

Figure 6:
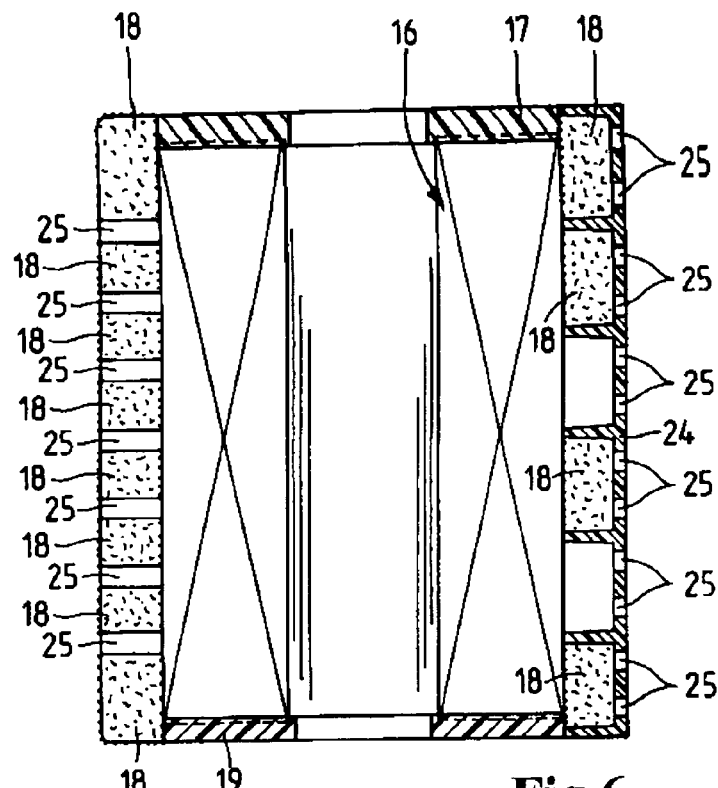

FIG. 6 also shows a structural embodiment of an inventive filter element in a sectional view. Parts corresponding to those in the previous figures are identified by like reference numerals. FIG. 6 again shows in a sectional view two possible variants of the design. Due to a reduction in the width of folds, the space saved can be used for a hollow cylindrical additive 18 which is arranged around the reduced element. To allow enough liquid to pass through the filter medium 16 at the beginning of the filter function, the additive 18 is provided with through-holes 25 on the left side of the partial section distributed over the circumference of the hollow cylindrical additive gel. Over the course of operation, the additive 18 dissolves so that more filter area is exposed for filtration of the liquid. The solution on the right takes a similar approach, but in this case the additive is accommodated in a receptacle 24 which is arranged in a toroidal form around the actual filter element. This receptacle 24 also has enough through-holes 25 to ensure a throughput of liquid. Between the individual webs of the receptacle 24 directed inward, the webs preferably being made of synthetic resin material, the additive 18 is arranged partially. The number of chambers is to be determined according to the desired )p value between the unfiltered side and the clean side.

Figure 7:
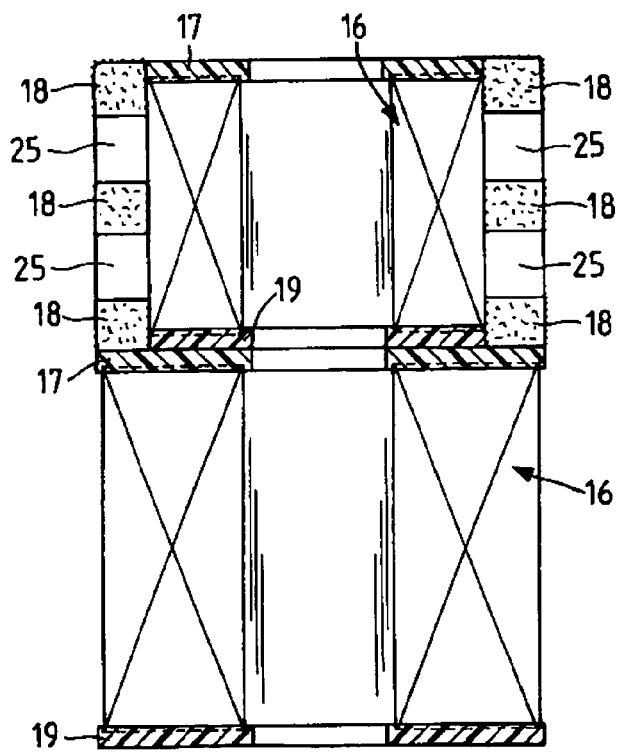

FIG. 7 shows a section through an inventive filter element, whereby the parts corresponding to those in the proceeding figures are identified by like reference numerals. In this case, only an axial partial area of the filter element is surrounded by an additive gel ring 18 in the form of a hollow cylinder. In the area of this enclosure, the filter element has a filter medium with a smaller filter width, whereby the addition of the filter width and the thickness of the additive gel ring 18 essentially achieve the filter width of the unrestricted filter medium. The additive gel ring 18 is in turn interrupted by the through-holes 25 to thereby ensure a sufficiently great liquid passage. The partial element with a smaller filter width and the additive gel ring 18 is joined axially to the remaining partial element by gluing, welding or by other known types of joining.

Figure 8:
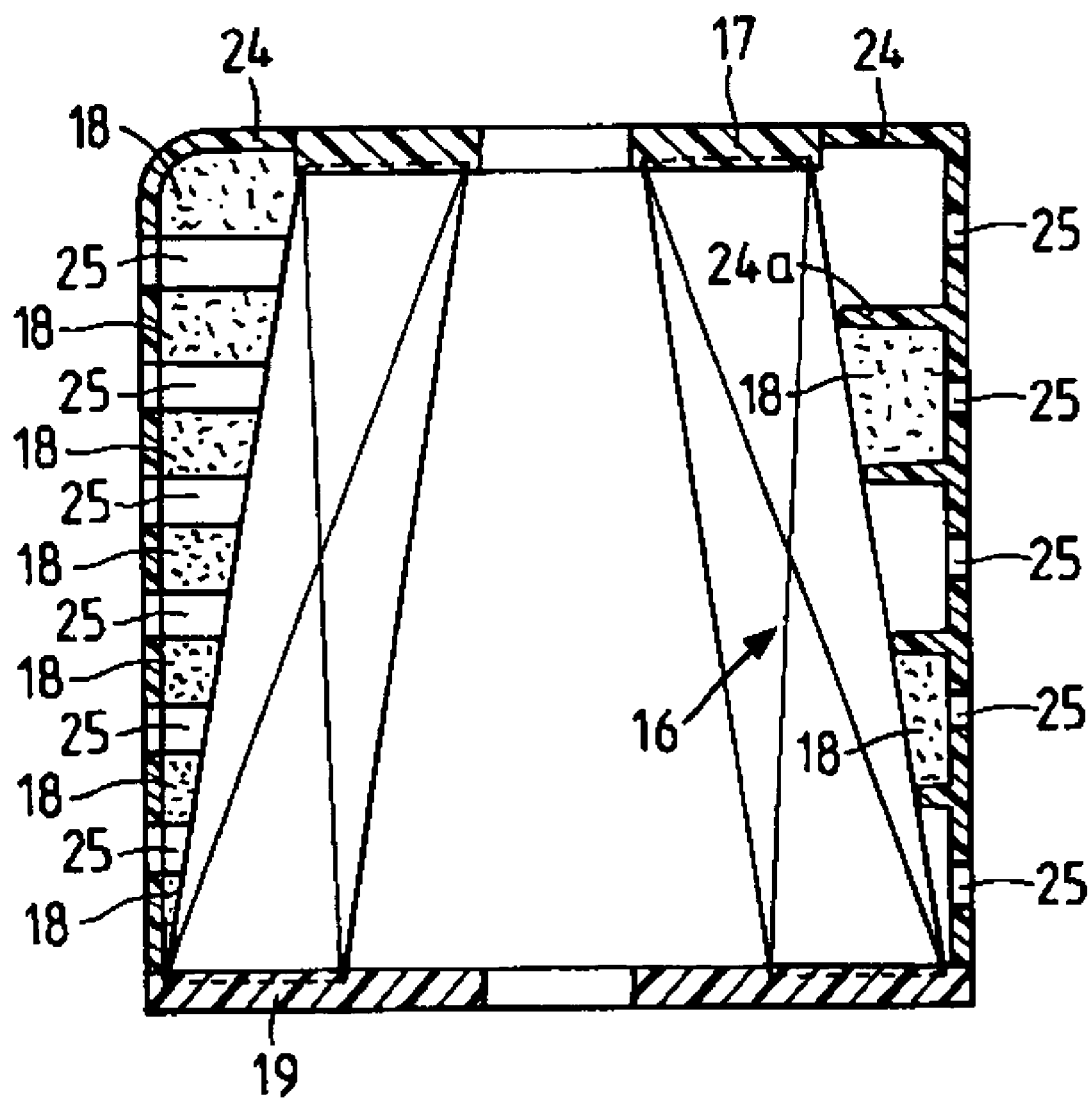

FIG. 8 shows another embodiment of a filter element according to the invention. Parts corresponding to those in the previous figures are identified by the same reference numerals. This filter element again has two filter end disks 17 and 19 at the ends, with the filter medium 16 having a truncated conical shape. However, the through-holes 25 provided in the interior of the end disks 17, 19 have the same diameter. The filter medium 16 is surrounded by an axially parallel receptacle 24, with the entire interspace between the filter medium 16 and the receptacle 24 being filled with the additive gel 18 on the left side of the partial section, with through-holes 25 being provided to allow the liquid to flow through. On the right side, the receptacle 24 is also provided with protrusions 24a running radially inward, adapting to the tapering shape of the filter medium 16. The receptacle 24 here is provided with through-holes 25, the additive 18 preferably being arranged in every second chamber thus formed between the protrusions in the interior of the receptacle 24.

Figure 9A:
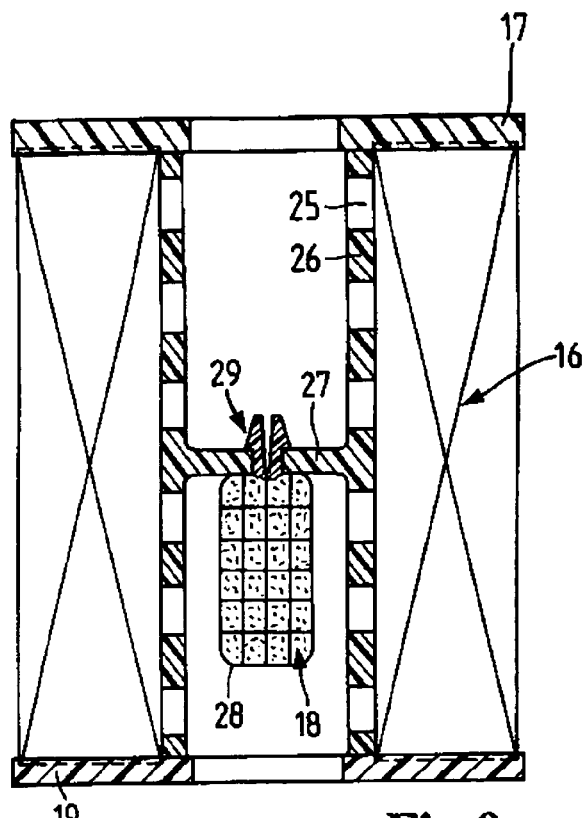

FIGS. 9a, b and c ultimately show other variations of the inventive filter element in sectional views. The parts corresponding to those in the previous figures are identified by like reference numerals. FIG. 9a shows a filter element with an upper end disk 17 and a lower end disk 19, each being closed on the end by a filter medium 16. A hollow cylindrical support tube 26 with through-holes 25 is arranged in the interior of the hollow cylindrical filter element 16, with the support tube 26, the end disk 17 and 19 and the filter medium 16 being inseparably joined together by gluing, welding or other methods. The central pipe 26 is additionally joined at the center by a web 27 which has an opening that is concentric with the filter element. A cage 28 containing the additive 18 engages in this web. This cage has openings distributed evenly around its circumference to ensure contact between the liquid and the additive 18. The cage 28 is snapped onto the web 27 by a snap hook 29.

Figure 9B:
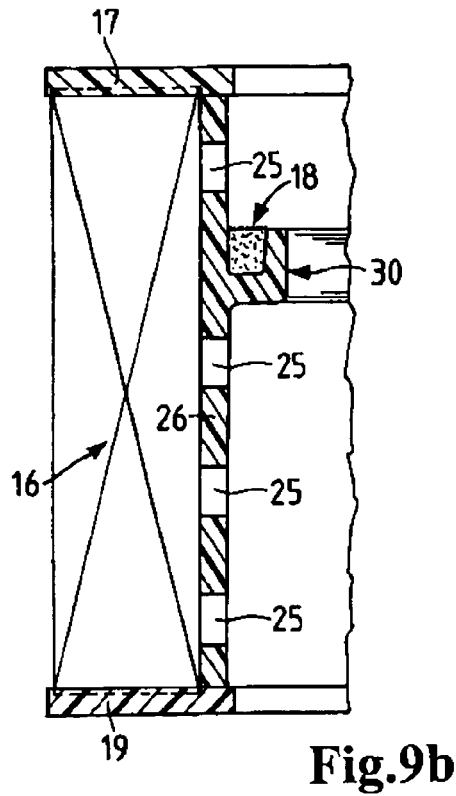

FIG. 9b shows another variant of a filter element with a support tube 26, where the support tube has on at least one part a U-shaped inward indentation which may be peripheral and accommodates the additive 18. The U-shaped indentation 30 is open axially toward the top and protrudes into the interior of the filter element.

Figure 9C:
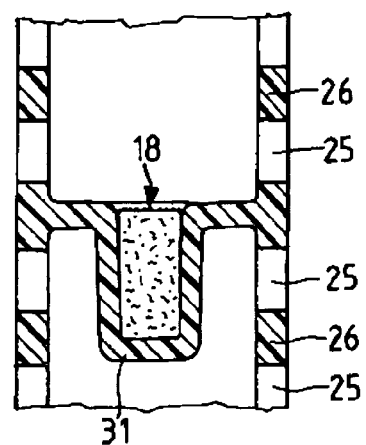

FIG. 9c shows a third variant of the inventive filter element with the support tube 26, a pot-shaped container 31 being formed here, starting from the inside walls of the support tube. This container is preferably joined in one piece to the support tube 26. The additive 18 is arranged in this container 31 which open toward the top and it is wetted by the liquid in the upper area, where it dissolves. The variants according to FIG. 9b and FIG. 9c also have through-holes 25 like those in FIG. 9a.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An apparatus for filtering a liquid, comprising a housing, a liquid inlet arranged in the housing, a liquid outlet arranged in the housing, a separating element arranged between the liquid inlet and the liquid outlet for removing particles from a flow of the liquid, and at least one additive body arranged in the apparatus for modifying a functional property of the liquid, wherein the additive body has a dimensionally stable, elastic form corresponding to and arranged in at least one geometric space defined by interior structure of the apparatus or by the separating element or both;
    wherein the separating element comprises a hollow, cylindrical filter element; and
    wherein the additive body is arranged as a block in the space between a lower end disk and the bottom of the housing.

2. An apparatus according to claim 1, wherein said additive body is a colloidally disperse gel body.

3. An apparatus according to claim 1, wherein a liquid permeable support tube is arranged inside the hollow, cylindrical filter element.

4. An apparatus according to claim 1, wherein the housing is fixedly attached to a housing cover and has a releasable connector for connection to a connecting flange of a liquid circuit traversed by the liquid.

5. An apparatus according to claim 1, wherein the housing is releasably connected to a housing cover so that it can be opened and the filter element replaced; said housing having a releasable connector for connection to a connecting flange of a liquid circuit traversed by the liquid.

6. An apparatus according to claim 1, wherein the separating element comprises a rotor arranged in the housing, whereby the housing constitutes a stator corresponding to the rotor.

7. An apparatus for filtering a liquid, comprising a housing, a liquid inlet arranged in the housing, a liquid outlet arranged in the housing, a separating element arranged between the liquid inlet and the liquid outlet for removing particles from a flow of the liquid, and at least one additive body arranged in the apparatus for modifying a functional property of the liquid, wherein the additive body has a dimensionally stable, elastic form corresponding to and arranged in at least one aeometric space defined by interior structure of the apparatus or by the separating element or both;
    wherein the separating element comprises a hollow, cylindrical filter element;

wherein the additive is disposed between two filter elements arranged in the filter housing.

8. An apparatus according to claim 7, wherein the two filter elements are permanently joined together.

9. An apparatus according to claim 7, wherein the two filter elements are detachably joined together.

10. An apparatus according to claim 1, wherein the additive body is arranged on an end face of the filter element.

11. An apparatus according to claim 1, wherein the additive body is arranged on an axial end face of the cylindrical filter element.

12. An apparatus according to claim 1, wherein an additive body is arranged on each of the two axial end faces of the cylindrical filter element.

13. An apparatus according to claim 1, wherein the additive body has an at least partially hollow cylindrical shape and is received in a correspondingly shaped receptacle in the filter element.

14. An apparatus according to claim 1, wherein the additive body comprises at least one axially extending radial segment connected to the filter element.

15. An apparatus according to claim 14, wherein the hollow cylindrical filter element is pleated, and the additive body is arranged in a pleat fold.

16. An apparatus according to claim 1, wherein the additive body is in the form a hollow cylinder extending over at least a partial area of the hollow cylindrical filter element, said filter element having a smaller effective diameter in said partial area.

17. An apparatus according to claim 3, wherein the additive body is arranged in or on the support tube.

18. An apparatus according to claim 3, wherein said support tube is made of synthetic resin material.

19. An apparatus according to claim 17, wherein the additive body is arranged in at least one segment in an interior area of the support tube, and the support tube is constructed with a double wall at least in said interior.

20. An apparatus according to claim 4, wherein the releasable connector is arranged on the housing cover, and the additive body is arranged on and attached to an inward-facing side of the housing cover.

21. An apparatus according to claim 4, wherein the housing has an essentially pot-shaped configuration, and the additive body is arranged on an inside housing wall in a cylindrical part of the housing.

22. An apparatus according to claim 4, wherein the housing has an essentially pot-shaped configuration, and the additive body is arranged at the bottom of the pot-shaped housing.

23. An apparatus according to claim 5, wherein the housing has an essentially pot-shaped configuration, and the additive body is received in a receptacle in and detachably connected to a bottom area of the pot-shaped housing.

24. An apparatus according to claim 5, wherein the housing has an essentially pot-shaped configuration, and the additive body is arranged as a sleeve in and detachably attached to a cylindrical part of the pot-shaped housing.

25. An apparatus according to claim 1, further comprising an internal housing member arranged in said housing, said internal housing member having at least one opening through which liquid can enter the internal housing member and containing the additive body, said additive body being replaceable in said internal housing member.

26. An apparatus according to claim 6, wherein the additive is replaceably arranged in the rotor.

27. An apparatus according to claim 6, wherein the additive is replaceably arranged in the stator.

28. A method of adding an additive to a liquid comprising:
providing an apparatus for filtering a liquid comprising a housing, a liquid inlet arranged in the housing, a liquid outlet arranged in the housing, a separating element arranged between the liquid inlet and the liquid outlet for removing particles from a flow of the liquid, and at least one additive body arranged in the apparatus for modifying a functional property of the liquid, and
passing the liquid through said apparatus, whereby said additive body decomposes at a controllable rate upon contact with the liquid;
wherein the rate of decomposition of the additive body is controlled by partial encapsulation of the additive body.

29. A method according to claim 28, wherein the additive body has a dimensionally stable, elastic form corresponding to and arranged in at least one geometric space defined by interior structure of the apparatus or by the separating element or both.

30. A method according to claim 28, wherein said additive body is a colloidally disperse gel body.

31. A method according to claim 28, wherein the rate of decomposition of the additive body is controlled by positioning the additive body in an area of a suitable velocity of flow.

32. A method according to claim 31, wherein the rate of decomposition is controlled thermally using heating or cooling element in the area of the additive body, and heating or cooling is effected as a function of the desired release of additive.

33. A method according to claim 28, wherein the rate of decomposition is controlled by varying the effective liquid wetting area of the additive body.

34. A method according to claim 33, wherein the additive is arranged encapsulated in the housing and openings are provided in the encapsulation, these openings being variable such that all opening diameters are adjustable between zero and full opening and the size of the openings is adjusted as a function of at least one measurement result of at least one sensor.

* * * * *

Disclaimer 7,323,102—Gunnar-Marcel Klein, Spiegelberg (DE); Markus Kolczyk, Mundelsheim (DE); Guenter Jokschas, Murrhardt (DE); Michael Harenbrock, Ludwigsburg (DE); Joerg Kramer, Remseck (DE). ADDITIVE DISPENSING FILTER APPARATUS. Patent dated January 29, 2008. Disclaimer filed May 7, 2008, by the assignee, Mann & Hummel GmbH.

Hereby disclaims the complete claims 28 through 34 of said patent.

*(Official Gazette September 30, 2008)*